US00RE50774E

(19) United States
(12) Reissued Patent
Chang

(10) Patent Number: US RE50,774 E
(45) Date of Reissued Patent: Feb. 3, 2026

(54) TABLE TOP

(71) Applicant: EP Family Corp., Walnut, CA (US)

(72) Inventor: Jeff Yongguang Chang, Pomona, CA (US)

(21) Appl. No.: 29/964,940

(22) Filed: Sep. 25, 2024

Related U.S. Patent Documents

Reissue of:
(64) Patent No.: Des. 934,012
Issued: Oct. 26, 2021
Appl. No.: 29/693,716
Filed: Jun. 4, 2019

(51) LOC (15) Cl. ..... 06-06
(52) U.S. Cl.
USPC ..... D6/707.19
(58) Field of Classification Search
USPC ..... D6/641, 642, 648, 648.1, 650, 650.1, D6/655, 656, 656.1, 656.11, 656.12
(Continued)

(56) References Cited

U.S. PATENT DOCUMENTS 476,400 A 6/1892 Morgan et al.
543,609 A 7/1895 Carter
(Continued)

OTHER PUBLICATIONS

Spanish Industrial Design No. I146513 to Muebles Bordonabe (16 Febero 2000, Boletin Oficial De La Propiedad Industrial at 718-719.
(Continued)

*Primary Examiner* — Darlington Ly
(74) *Attorney, Agent, or Firm* — Tommy S F Wang; Wang IP Law Group, P.C.

(57) CLAIM

The ornamental design for a table top, as shown and described.

DESCRIPTION

FIG. 1 is a perspective view of a top portion of [a] *an unassembled* table top isolated for clarity of illustration showing my new design;
FIG. 2 is a front view thereof;
FIG. 3 is a rear view thereof;
FIG. 4 is a left side view thereof;
FIG. 5 is a right side view thereof;
FIG. 6 is a top view thereof;
FIG. 7 is a bottom view thereof;
FIG. 8 is another perspective view thereof shown in an environment of use;
FIG. 9 is a perspective view of a bottom portion of the *unassembled* table top isolated for clarity of illustration;
FIG. 10 is a front view thereof;
FIG. 11 is a rear view thereof;
FIG. 12 is a left side view thereof;
FIG. 13 is a right side view thereof;
FIG. 14 is a top view thereof;
FIG. 15 is a bottom view thereof;
FIG. 16 is a perspective view of the *assembled* table top;
FIG. 17 is a front view thereof;
FIG. 18 is a rear view thereof;
FIG. 19 is a left side view thereof;
FIG. 20 is a right side view thereof;
FIG. 21 is a top view thereof;
FIG. 22 is a bottom view thereof; and,
FIG. 23 is a perspective view thereof shown in an environment of use.

The broken line portions of the table top in FIGS. 1-23 represent portions of the article that form no part of the claim. The broken lines of the tenons in [FIG.] *FIGS. 1-3, and* 8 illustrate environment that form no part of the claimed design. The broken lines of the bases in FIG. 23 illustrate environment that form no part of the claimed design. The dot-dash broken lines in FIGS. 1-3, 8-11 16-18 and 23 represent boundary lines and form no part of the claimed design.

1 Claim, 16 Drawing Sheets

Figure 7:
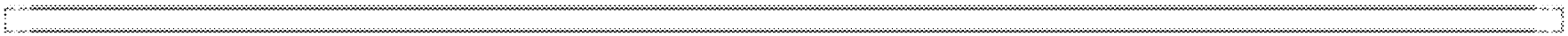
Figure 10:
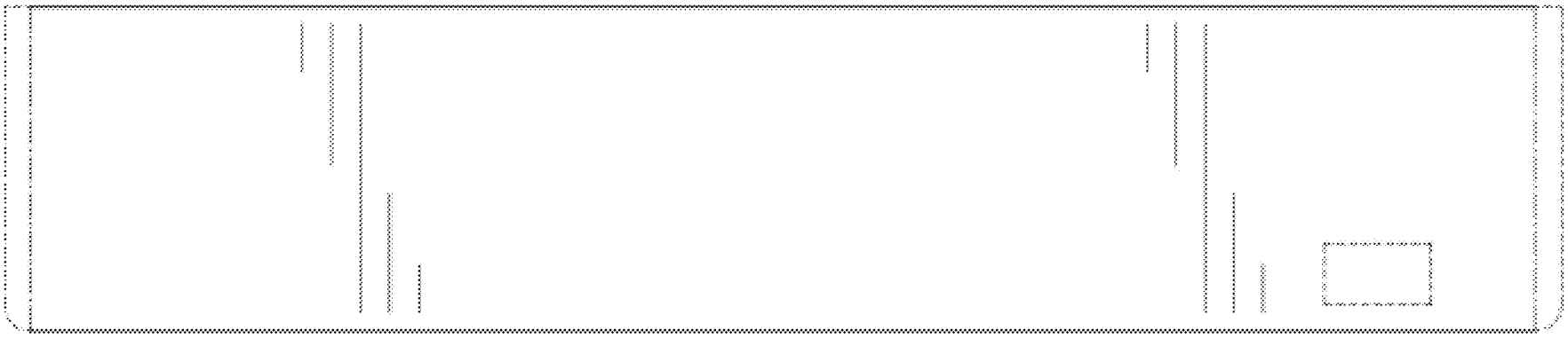
Figure 11:
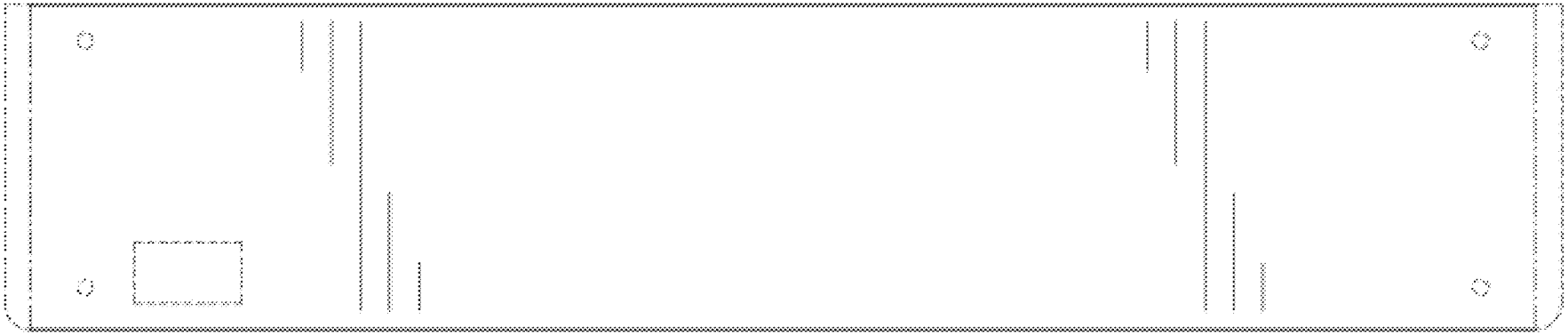
Figure 12:
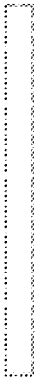
Figure 13:
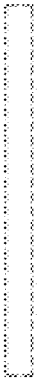
Figure 15:
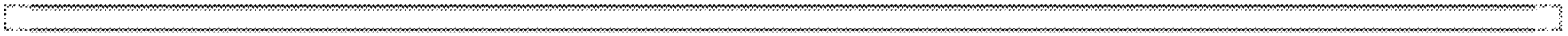
Figure 16:
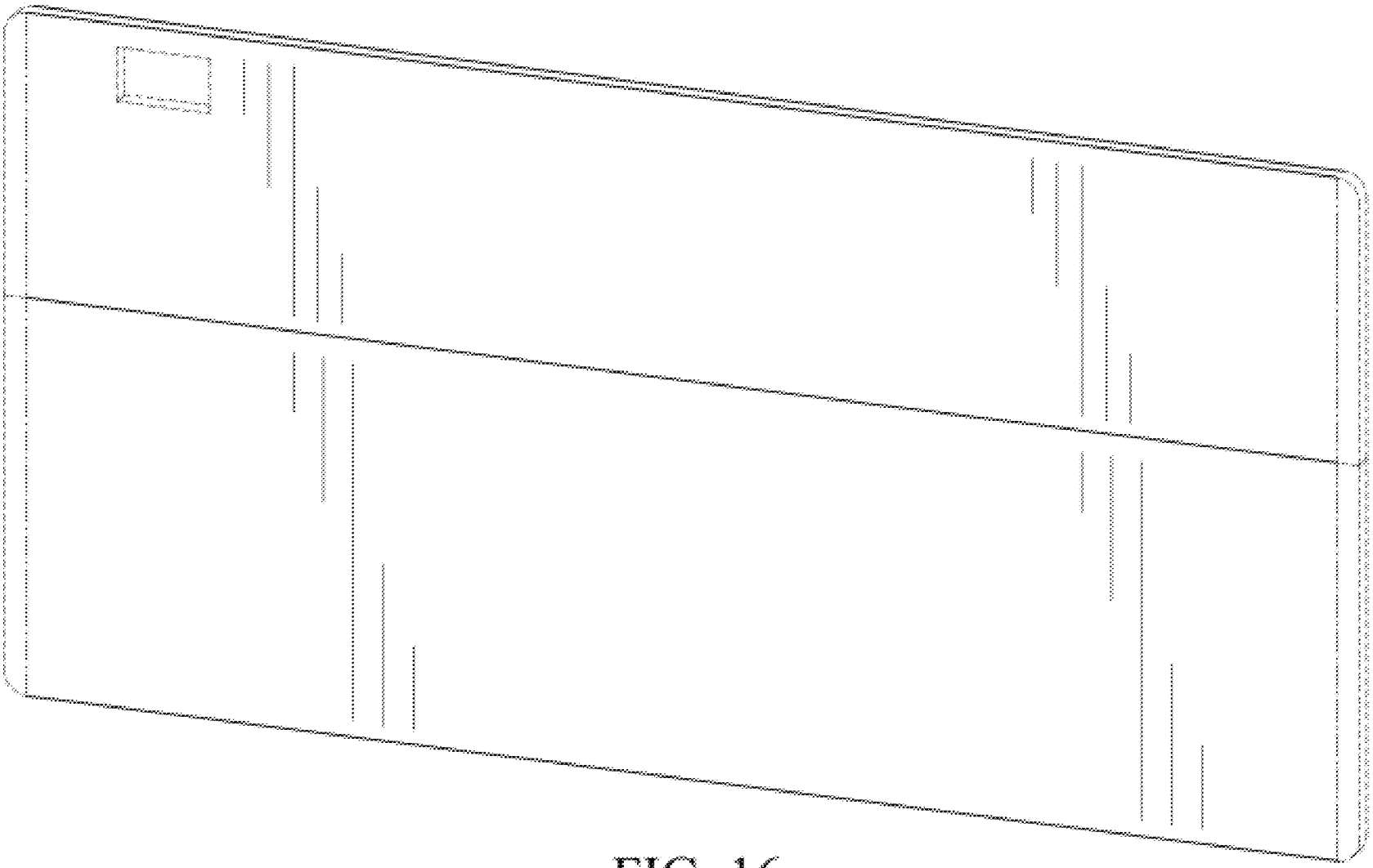
Figure 17:
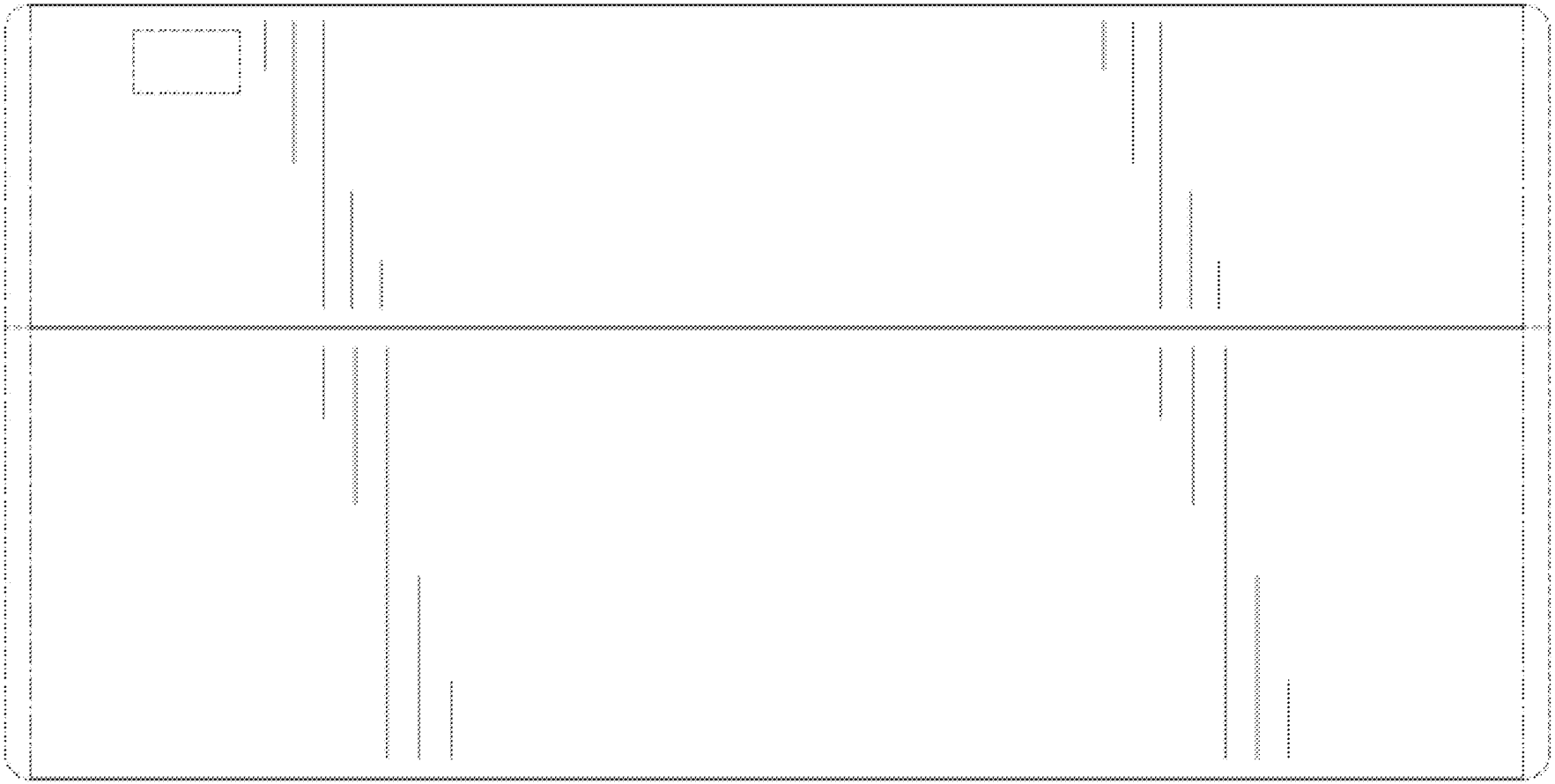
Figure 18:
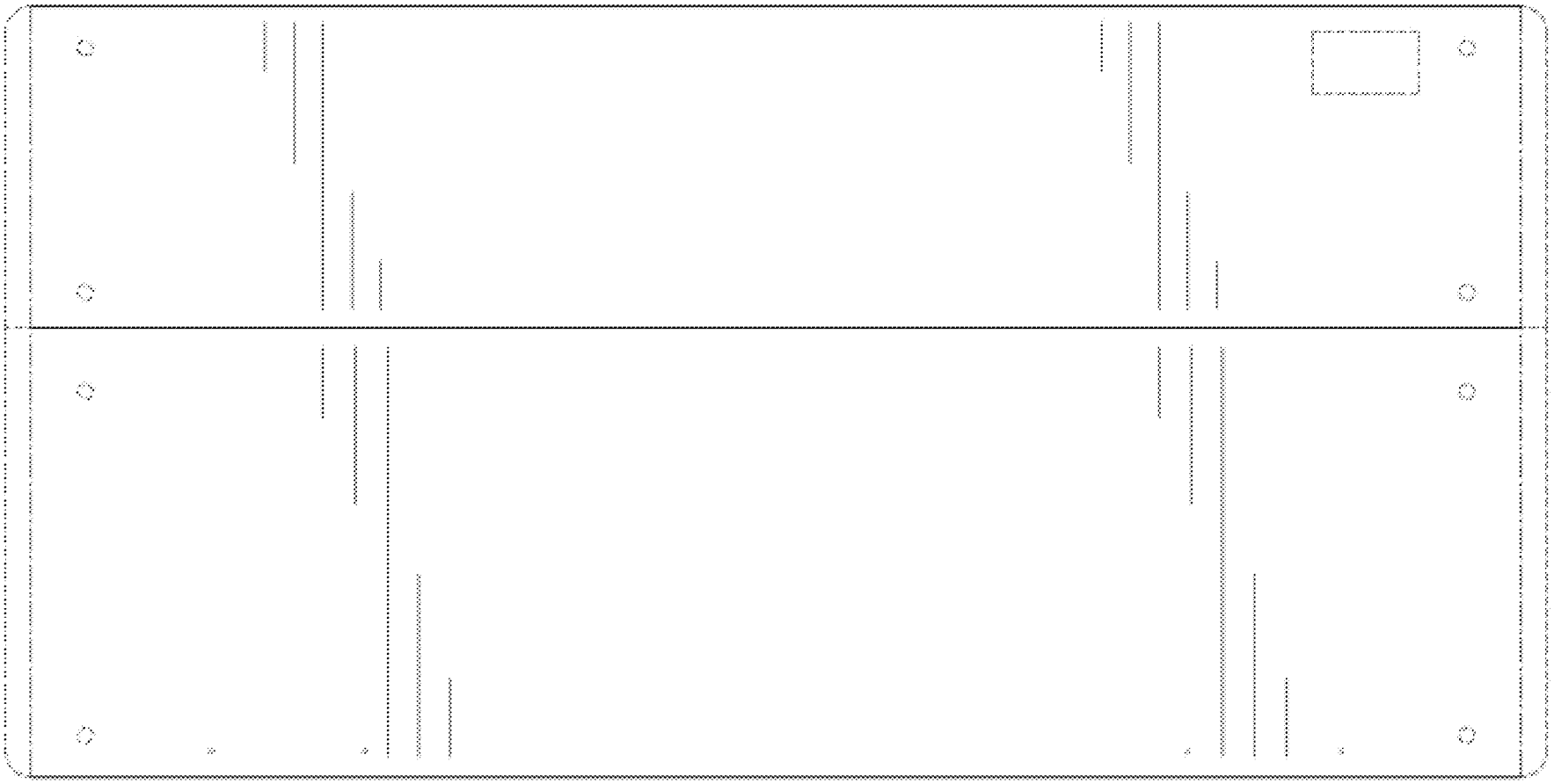
Figure 20:
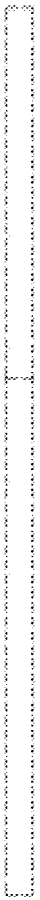
Figure 19:
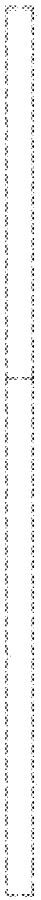
Figure 21:
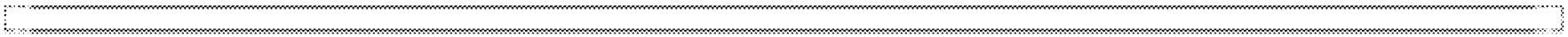
Figure 22:
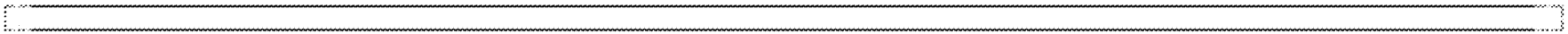
Figure 23:
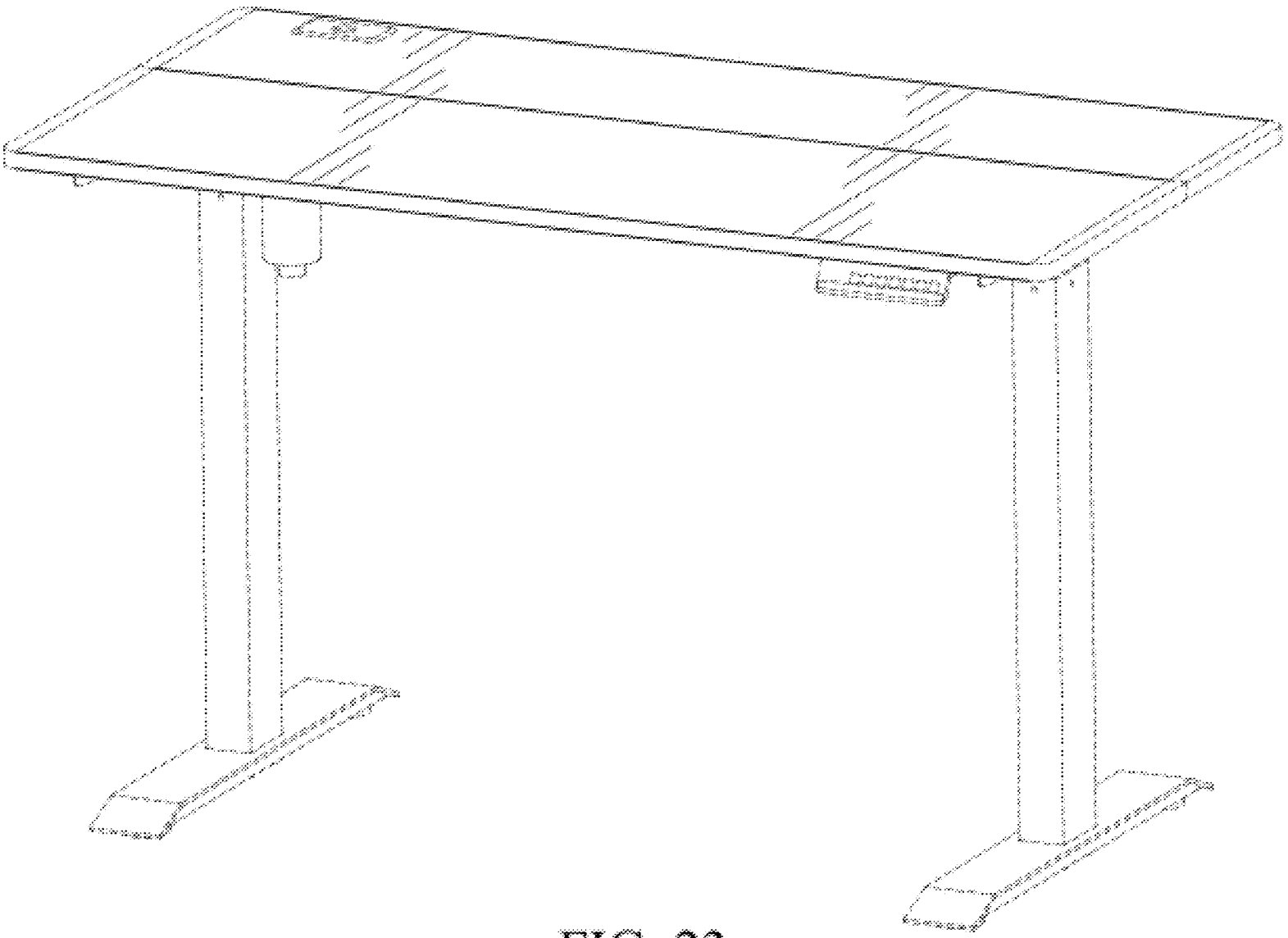

Matter enclosed in heavy brackets [ ] appears in the original patent but forms no part of this reissue; matter printed in italics indicates the additions made by reissue.

(58) Field of Classification Search
CPC ..... A47B 7/00; A47B 13/00; A47B 13/02; A47B 13/04; A47B 13/06; A47B 13/08; A47B 17/00; A47B 21/00; A47B 2200/0001; A47B 2200/0011; A47B 2200/012; A47B 2200/002
See application file for complete search history.

(56) References Cited

U.S. PATENT DOCUMENTS 666,435 A 1/1901 Oliver
1,755,694 A * 4/1930 Keppler ..... B65D 5/248 229/175
2,536,366 A * 1/1951 Harris ..... A47B 1/05 38/139
2,631,074 A * 3/1953 Stump ..... D05B 75/02 108/102
2,646,324 A * 7/1953 Bereman ..... A47B 3/083 108/35
2,715,558 A * 8/1955 Bell ..... A47B 3/0912 108/35
2,755,153 A * 7/1956 Rachman ..... A47B 3/083 108/35
2,843,226 A * 7/1958 Nordmark ..... A47B 41/04 108/6
D217,161 S * 4/1970 Sobel et al. ..... D6/705
D300,791 S * 4/1989 Osvold ..... D6/707.19
D328,680 S * 8/1992 Zapf ..... D6/707.19
5,259,326 A * 11/1993 Borgman ..... A47B 9/00 108/147
5,323,695 A * 6/1994 Borgman ..... A47B 9/00 108/147
D424,325 S * 5/2000 Iannaccone ..... D6/655
D483,970 S * 12/2003 Lin ..... D6/707.19
6,983,493 B1 * 1/2006 Shaumyan ..... A47K 17/022 4/254
D648,584 S * 11/2011 Ellis ..... D6/707.19
D677,502 S * 3/2013 Ryan ..... D6/707.22
D687,657 S * 8/2013 Ruiter ..... D6/692.3
D703,983 S * 5/2014 Poisson ..... A47B 97/00 D6/705
D742,670 S * 11/2015 Lee ..... D6/707
D767,926 S * 10/2016 Denby ..... D6/705
D819,371 S * 6/2018 Cao ..... D6/656.16
D833,981 S * 11/2018 Seal ..... D13/162
D873,056 S * 1/2020 Stafford ..... D6/675
D899,165 S * 10/2020 Nakata ..... D6/656
D904,093 S * 12/2020 Irgang ..... D6/705
D911,088 S * 2/2021 Irgang ..... D6/705
D915,108 S * 4/2021 Chipperfield ..... D6/691.1
2017/0203549 A1 * 7/2017 Garrison ..... B32B 3/14
2018/0310368 A1 * 10/2018 Nam ..... H02J 50/10
2020/0268144 A1 * 8/2020 Mehandjiysky ..... A47B 13/081

OTHER PUBLICATIONS

Ikea, Table Galant, Archived Ikea website from Wayback Machine web archive, Apr. 18, 2024.

Evans Bros. London, Joints in Woodwork (3d ed. 1920), p. 97.

SHW, posted at Amazon.com, posted on Aug. 27, 2018, site visited Apr. 20, 2021. online, available from internet: https://www.amazon.com/SHW-Electric-Height-Adjustable-Computer/dp/B07GVRKCWP?ref_=ast_sto_dp&th=1&psc=1 (Year: 2018).*

* cited by examiner

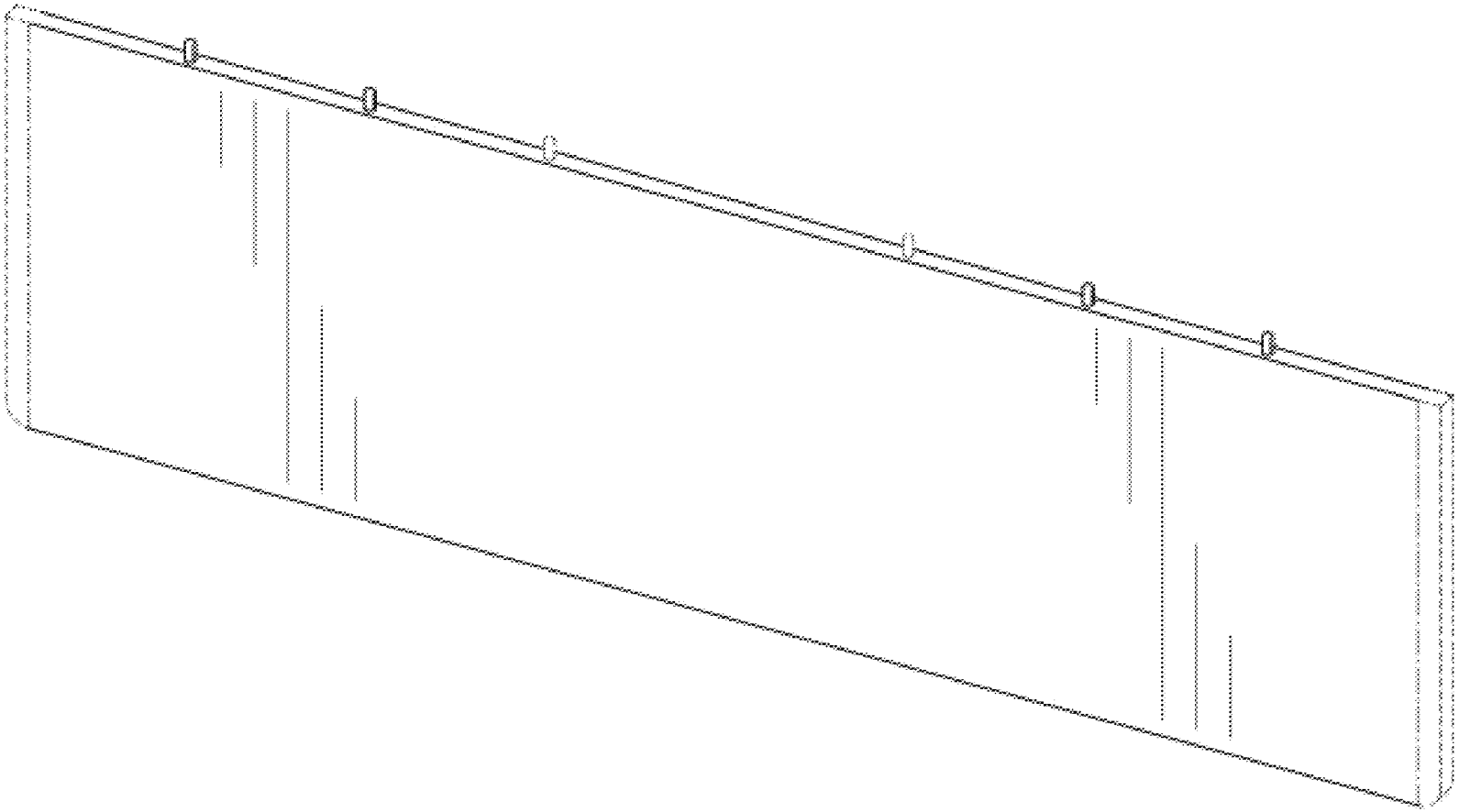
FIG. 1
[Amended]

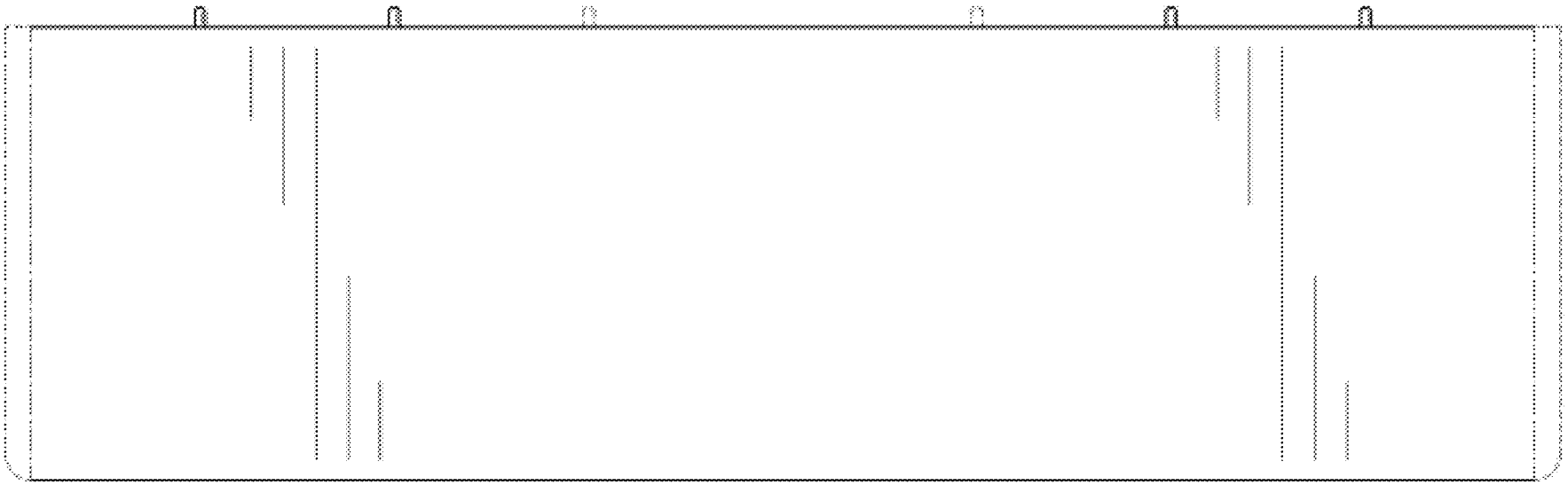
FIG. 2
[Amended]

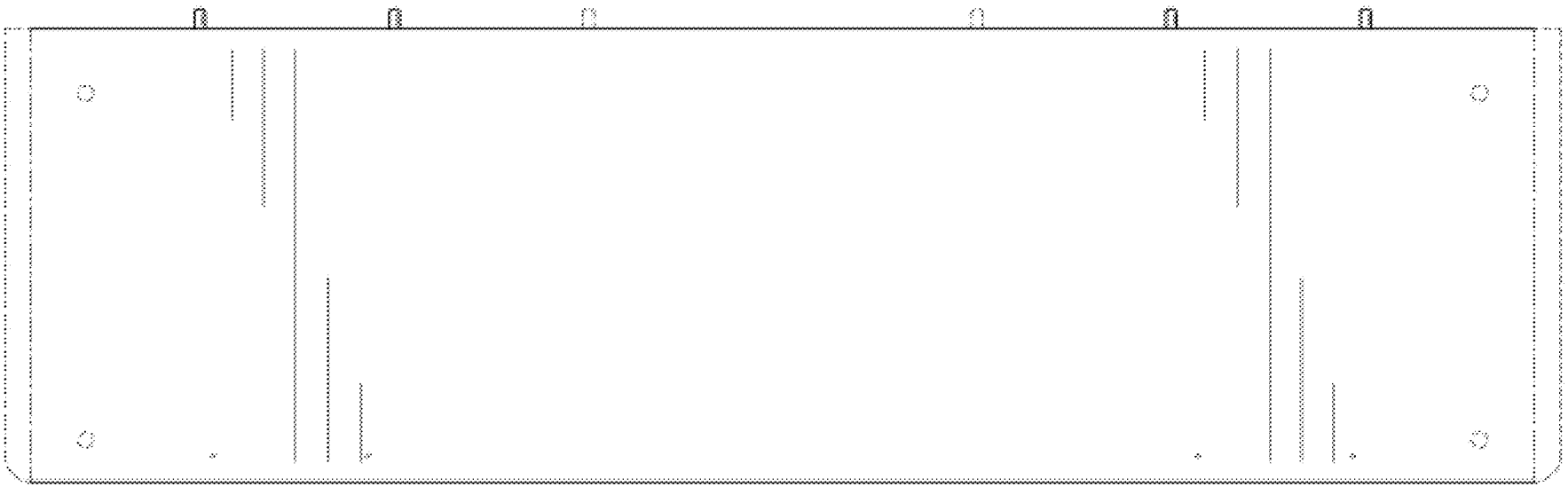
FIG. 3
[Amended]

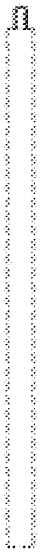
FIG. 5
[Amended]
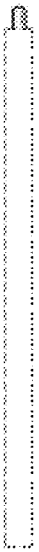
FIG. 4
[Amended]

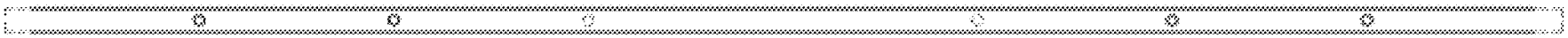
FIG. 6
[Amended]

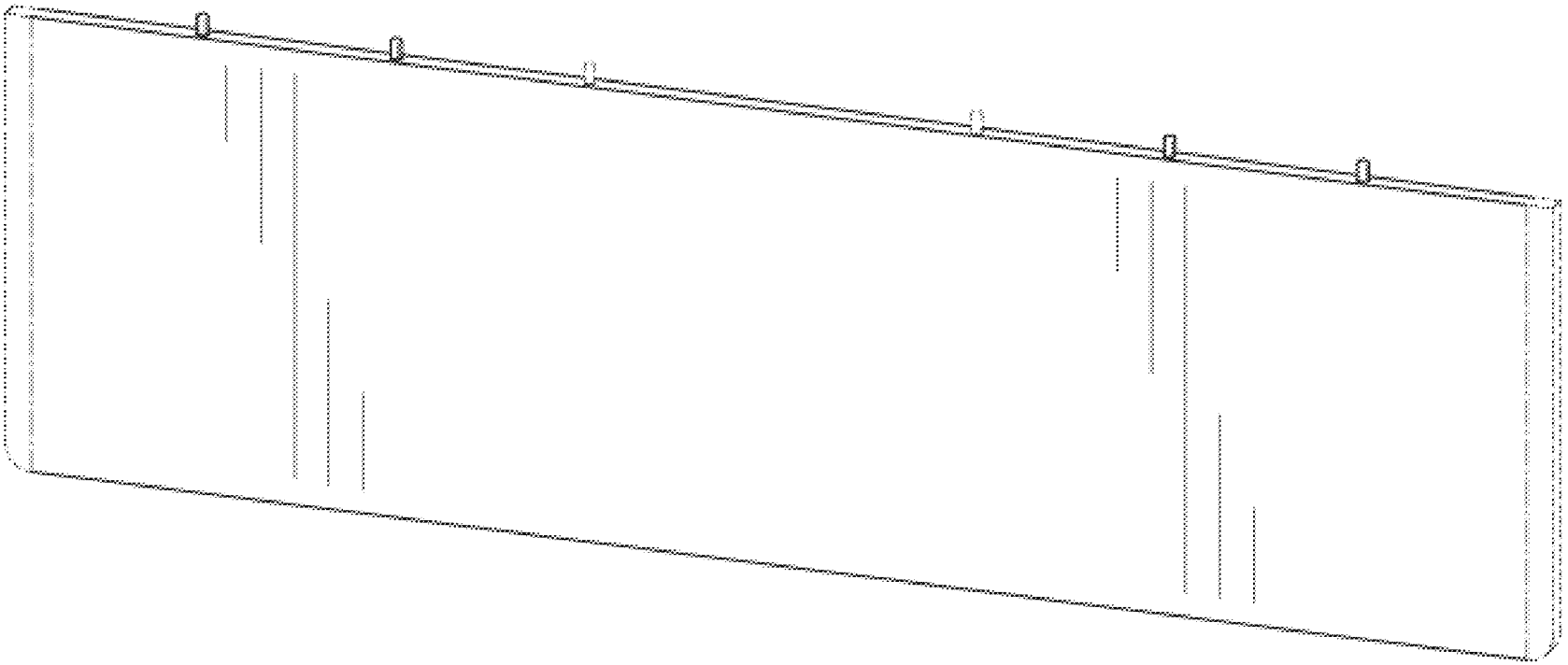
FIG. 8
[Amended]

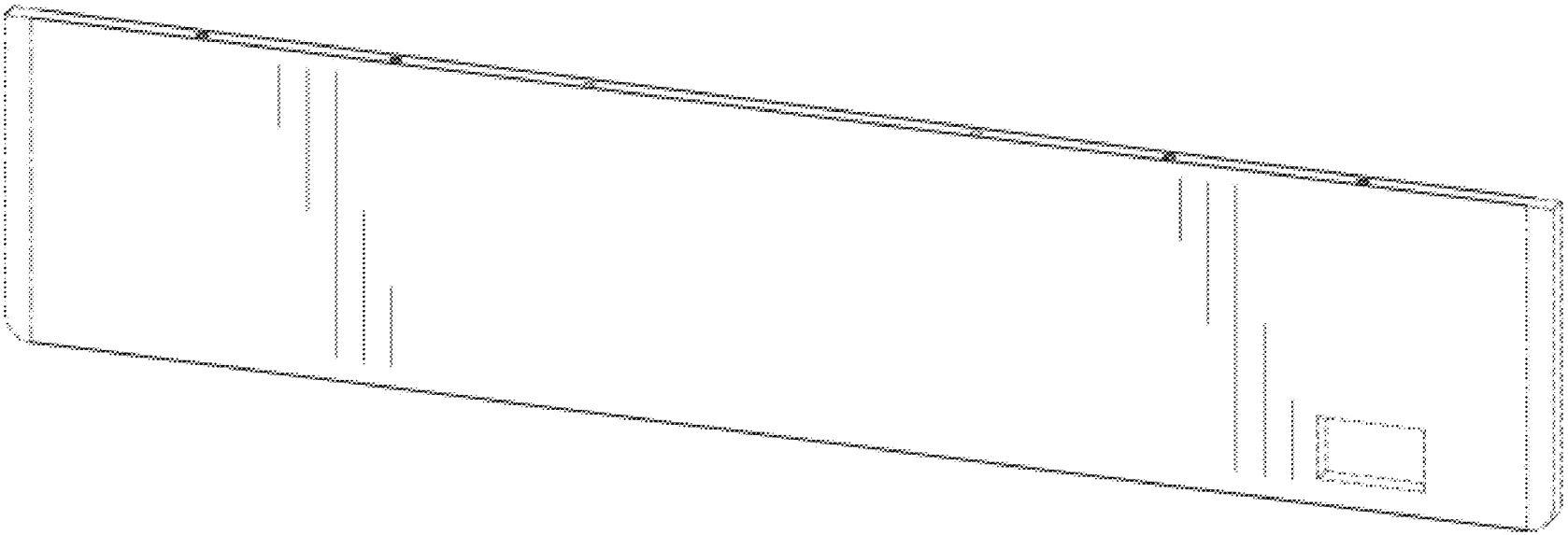
FIG. 9
[Amended]

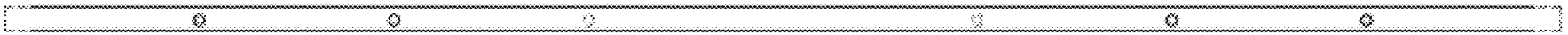
FIG. 14
[Amended]